(12) United States Patent
Göransson et al.

(10) Patent No.: US 12,286,937 B2
(45) Date of Patent: Apr. 29, 2025

(54) METHOD OF CONTROLLING INLET VALVES AND EXHAUST VALVES OF AN INTERNAL COMBUSTION ENGINE, CONTROL ARRANGEMENT, COMBUSTION ENGINE, AND VEHICLE

(71) Applicant: Scania CV AB, Södertälje (SE)

(72) Inventors: Hans Göransson, Älvsjö (SE); Henrik Andersson, Lidingö (SE); Pontus Johansson, Hägersten (SE); Joakim Rodebäck, Huddinge (SE); Andreas Dahl, Nyköping (SE); Erik Höckerdal, Södertälje (SE); Bengt Anderberg, Grödinge (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/562,129

(22) PCT Filed: May 23, 2022

(86) PCT No.: PCT/SE2022/050499
§ 371 (c)(1),
(2) Date: Nov. 17, 2023

(87) PCT Pub. No.: WO2022/250597
PCT Pub. Date: Dec. 1, 2022

(65) Prior Publication Data
US 2024/0247616 A1    Jul. 25, 2024

(30) Foreign Application Priority Data

May 27, 2021    (SE) .................... 2150675-3

(51) Int. Cl.
*F02D 13/02* (2006.01)
*F01L 1/34* (2006.01)
*F02D 13/04* (2006.01)

(52) U.S. Cl.
CPC ............ *F02D 13/0219* (2013.01); *F01L 1/34* (2013.01); *F02D 13/0207* (2013.01); *F02D 13/0249* (2013.01); *F02D 13/04* (2013.01)

(58) Field of Classification Search
CPC ............ F02D 13/0207; F02D 13/0219; F02D 13/0249; F02D 13/04; F01L 1/34
See application file for complete search history.

(56) References Cited

U.S. PATENT DOCUMENTS 3,234,923 A       2/1966   Fleck et al.
3,547,087 A  *  12/1970   Siegler .................... F01L 13/06
                                                          123/321

(Continued)

FOREIGN PATENT DOCUMENTS

EP    0294682 A1    12/1988
EP    1803913 A2    7/2007

(Continued)

OTHER PUBLICATIONS

Jun. 16, 2022—(WO) International Search Report & Written Opinion—App. No. PCT/SE2022/050499.

(Continued)

*Primary Examiner* — Audrey B. Walter
(74) *Attorney, Agent, or Firm* — Banner & Witcoff, Ltd.

(57) ABSTRACT

A method of controlling inlet valves and exhaust valves of a cylinder of an internal combustion engine to obtain an engine braking effect is disclosed. The method comprises the steps of preventing at least one exhaust valve of the cylinder from closing completely during a plurality of successive intake, compression, expansion, and exhaust strokes of the cylinder, phase shifting control of at least one exhaust valve and regulating the amount of air being pumped through the cylinder by phase shifting control of at least one inlet valve of the cylinder. The present disclosure further relates to a computer program, a computer-readable medium, a control (Continued)

arrangement, an internal combustion engine, and a vehicle comprising an internal combustion engine.

14 Claims, 4 Drawing Sheets

(56) References Cited

U.S. PATENT DOCUMENTS

| | | |
|---|---|---|
| 7,568,465 B1 | 8/2009 | Wiley |
| 2013/0220272 A1 | 8/2013 | Hisaminato et al. |
| 2018/0274456 A1* | 9/2018 | Gunnarsson ............ F01L 1/053 |
| 2020/0122709 A1* | 4/2020 | Cunningham ...... F02D 13/0207 |

FOREIGN PATENT DOCUMENTS

| | | |
|---|---|---|
| EP | 3379043 A1 | 9/2018 |
| SE | 1750336 A1 | 9/2018 |
| WO | 2004059131 A2 | 7/2004 |
| WO | 2020088798 A1 | 5/2020 |

OTHER PUBLICATIONS

Sep. 28, 2020—(SE) Search Report—App. No. 2150675-3.
Jan. 13, 2022—(SE) Office Action—App. No. 2150675-3.

\* cited by examiner

METHOD OF CONTROLLING INLET VALVES AND EXHAUST VALVES OF AN INTERNAL COMBUSTION ENGINE, CONTROL ARRANGEMENT, COMBUSTION ENGINE, AND VEHICLE

CROSS-REFERENCE TO RELATED APPLICATIONS

The present application claims priority from and is a U.S. National Phase of International Application No. PCT/SE2022/050499, which was filed on May 23, 2022, designating the United States of America and claiming priority to Swedish Patent Application No. 2150675-3, filed on May 27, 2021. This application claims priority to and the benefit of the above-identified applications, which are all fully incorporated by reference herein in their entireties.

TECHNICAL FIELD

The present disclosure relates to a method of controlling inlet valves and exhaust valves of a cylinder of an internal combustion engine to obtain an engine braking effect. The present disclosure further relates to a computer program, a computer-readable medium, a control arrangement configured to control inlet valves and exhaust valves of a cylinder of an internal combustion engine to obtain an engine braking effect, an internal combustion engine comprising a control arrangement, and a vehicle comprising an internal combustion engine.

BACKGROUND

Internal combustion engines, such as four-stroke internal combustion engines, comprise one or more cylinders and a piston arranged in each cylinder. The pistons are connected to a crankshaft of the engine and are arranged to reciprocate within the cylinders upon rotation of the crankshaft. The engine usually further comprises one or more inlet valves and outlet valves as well as one or more fuel supply arrangements. The one or more inlet valves and outlet valves are controlled by a respective valve control arrangement usually comprising one or more camshafts rotatably connected to a crankshaft of the engine, via a belt, chain, gears, or similar. A four-stroke internal combustion engine completes four separate strokes while turning a crankshaft. A stroke refers to the full travel of the piston along the cylinder, in either direction. The uppermost position of the piston in the cylinder is usually referred to as the top dead centre TDC, and the lowermost position of the piston in the cylinder is usually referred to as the bottom dead centre BDC.

The strokes are completed in the following order, inlet stroke, compression stroke, expansion stroke and exhaust stroke. During operation of a conventional four-stroke internal combustion engine, the inlet valve control arrangement controls inlet valves of a cylinder to an open state during the inlet stroke of a piston within the cylinder, to allow air, or a mixture of air and fuel, to enter the cylinder. During the compression stroke, all valves should be closed to allow compression of the air, or the mixture of the air and fuel, in the cylinder. If the engine is in a power producing state, fuel in the cylinder is ignited, usually towards the end of the compression stroke, for example by a spark plug or by compression heat in the cylinder. The combustion of fuel within the cylinder significantly increases pressure and temperature in the cylinder. The combustion of the fuel usually continues into a significant portion of the subsequent expansion stroke. The increased pressure and temperature in the cylinder obtained by the combustion is partially converted into mechanical work supplied to the crank shaft during the expansion stroke. Obviously, all valves should remain closed during the expansion stroke to allow the increased pressure and temperature to be converted into mechanical work. The expansion stroke is also usually referred to as the combustion stroke, since usually, most of the combustion takes place during the expansion stroke. In the subsequent exhaust stroke, the exhaust valve control arrangement controls exhaust valves of the cylinder to an open state to allow exhaust gases to be expelled out of the cylinder into an exhaust system of the combustion engine.

During normal engine braking, occurring for example when a driver of a vehicle releases an accelerator pedal, the engine will continue to operate in the above described strokes, with the exception that, normally, no fuel is supplied to the engine during engine braking, and consequently, no combustion will take place during the end of the compression stroke or during the expansion stroke. In this condition, the engine will provide some braking torque due to internal friction and due to the pumping of air from the inlet to the exhaust, in the respective inlet stroke and exhaust stroke. As a piston travels upward during its compression stroke, the gases that are trapped in the cylinder are compressed. The compressed gases oppose the upward motion of the piston. However, almost all the energy stored in the compressed gases is returned to the crank shaft on the subsequent expansion stroke. Thereby, during normal engine braking, the compression stroke together with the subsequent expansion stroke, will not contribute to a significant braking torque of the engine.

Some legislations require heavier vehicles to be provided with an auxiliary braking system in addition to wheel brakes. An efficient means of braking the vehicle is to utilize an engine to provide extra braking force because already existing systems of the vehicle can be utilized to generate the braking force needed and to transport the heat generated during braking to the surroundings. Moreover, the use of an engine to provide extra braking force reduces wear of the wheel brakes. There are some different types of methods and arrangements for increasing the braking torque of an engine. A compression release engine brake, sometimes referred to as a Jake brake or Jacobs brake, is an engine braking mechanism used in some engines. Some compression release brake arrangements comprise a valve actuator assembly which is configured to open exhaust valves in the cylinders after the compression stroke to release the compressed air trapped in the cylinders to the exhaust system. Thereby, the energy stored in the compressed gases during the compression stroke will not be returned to the crank shaft in the subsequent expansion stroke, which increases the braking torque of the engine. Some compression release engine brake arrangements comprise a hydraulic arrangement which actuates the valve actuator assembly by supplying a hydraulic pressure to the valve actuator assembly.

Another system/method of increasing the braking torque of an engine is to utilize a so called exhaust brake in which valve arranged in the exhaust system restricts the flow of gas therethrough and thereby generates a backpressure. The backpressure opposes the upward motion of the pistons when they are moving towards the top dead centre in the exhaust stroke, which thereby increases the braking torque of the engine.

Still another system/method of increasing the braking torque of an engine is to maintain a small lift of one or more exhaust valves of the engine during all strokes of the engine. In this manner, energy which otherwise would be stored in the form of compressed gas in the cylinder is not returned to the crank shaft in the expansion strokes because compressed gas is evacuated through the one or more exhaust valves in the compression strokes of the engine. Thereby, the braking torque of the engine is increased.

Even though it is wanted to be able to obtain a high maximum braking torque of an engine, in some driving situations of a vehicle, it is wanted to apply lower levels of braking torque. As an example, a lower level of braking torque may be wanted in a situation where the vehicle is travelling down a slope and a constant speed of the vehicle is wanted. However, many types of systems which utilize the engine to provide extra braking torque can only be activated or deactivated and wherein the obtained braking force of the vehicle mainly is determined by the rotational speed of the engine. Therefore, many drivers utilize the wheel brakes in some situations to avoid too high retardation levels of the vehicle. The use of the wheel brakes wears the wheel brakes and prolonged use of wheel brakes upon travelling down a slope risks overheating the wheel brakes.

Due to environmental concerns, almost all vehicles for sale today comprise some sort of exhaust after treatment system. Examples are catalytic converters, particulate filters, and Selective catalytic reduction (SCR) arrangements. A selective catalytic reduction arrangement is a means of converting nitrogen oxides, also referred to as NOx with the aid of a catalyst into diatomic nitrogen N2, and water H2O. A gaseous reductant, typically anhydrous ammonia, aqueous ammonia, or urea is added to a stream of exhaust gas and is adsorbed onto a catalyst. Function of these exhaust after treatment systems rely on the high temperature of the exhaust gases. Problems may arise upon long lasting engine braking operations since the gases leaving the engine during engine braking is cooler than exhaust gases produced in a power producing mode, which gases may cool the exhaust after treatment system to a temperature in which it may not function properly.

Moreover, some types of systems and methods which utilize an engine for providing extra braking torque puts strain on valve control arrangement of inlet valves and/or outlet valves of the engine and the respective drive train thereof, at least in some operational conditions. Therefore, when using such a system or method, the activation and deactivation of braking can be challenging since it must be performed in a manner that ensures that the valve control arrangements do not become damaged or are subjected to premature wear.

Furthermore, generally, on today's consumer market, it is an advantage if products, such as vehicles and associated components, systems, and arrangements, comprise different features and functions while having conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a method of controlling inlet valves and exhaust valves of a cylinder of an internal combustion engine to obtain an engine braking effect. The method comprises the steps of:

preventing at least one exhaust valve of the cylinder from closing completely during a plurality of successive intake, compression, expansion, and exhaust strokes of the cylinder, phase shifting control of at least one exhaust valve of the cylinder such that opening and closing events of the at least one exhaust valve are advanced as compared to when the cylinder is operating in a power generating mode, and regulating the amount of air being pumped through the cylinder by phase shifting control of at least one inlet valve of the cylinder.

By preventing the at least one exhaust valve of the cylinder from closing completely, the engine is braked in an efficient manner because when the piston is moving towards the top dead centre in the compression stroke, compressed gas in the cylinder oppose the motion of the piston while some of the gas being compressed can be evacuated through the partially opened exhaust valve. Thus, due to the evacuation of compressed gas through the partially opened exhaust valve, energy which otherwise would be stored in the form of compressed gas in the cylinder is not returned to the crank shaft on the subsequent expansion stroke.

Moreover, since the method comprises the step of phase shifting control of at least one exhaust valve such that opening and closing events of the at least one exhaust valve are advanced, a method is provided capable of significantly increasing the maximum obtainable braking torque of the engine. This is because the control of at least one exhaust valve can be phase shifted to positions in which the at least one exhaust valves assume the partially opened position, instead of a fully open position, in the exhaust stroke of the engine. In this manner, compressed gas in the cylinder can oppose the motion of the piston also in the exhaust strokes of the engine to increase the braking torque of the engine.

In addition, since the method comprises the step of regulating the amount of air being pumped through the cylinder by phase shifting control of at least one inlet valve of the cylinder, the method provides conditions for a stepless control of the braking torque obtained. Furthermore, since the method comprises the step of regulating the amount of air being pumped through the cylinder, a method is provided having conditions for regulating the temperature of gas supplied to an exhaust system of the engine during the braking procedure so as to control the temperature of an exhaust after treatment system of the engine.

Moreover, since the method comprises the step of preventing the at least one exhaust valve of the cylinder from closing completely, the method provides conditions for a simple, reliable, and cost-efficient implementation in an engine of a vehicle. This is because simple and reliable components and systems can be utilized to prevent at least one exhaust valve of the cylinder from closing completely during a plurality of successive intake, compression, expansion, and exhaust strokes of the cylinder.

Furthermore, since the method comprises the step of preventing the at least one exhaust valve of the cylinder from closing completely, a method is provided having conditions for obtaining a low load on valve control arrangements of valves of the engine and the respective drive train thereof. In addition, a method is provided in which braking can be activated and deactivated in a simple and efficient manner without risking damage or premature wear of valve control arrangements the engine and the respective drive train thereof.

Thus, in summary, a cost-efficient method is provided capable of providing a high maximum obtainable braking power and conditions for a stepless control of the magnitude of the braking power while obtaining a low load on valve control arrangements of the engine and the respective drive train thereof. Moreover, the method provides conditions for controlling the temperature of an exhaust after treatment system in an efficient manner during the braking procedure. In addition, a method is provided allowing a simple and efficient activation and deactivation of braking without risking damage or premature wear of valve control arrangements of the engine and the respective drive train thereof.

Accordingly, a method is provided overcoming, or at least alleviating, at least some of the above-mentioned problems and drawbacks. As a result, the above-mentioned object is achieved.

Optionally, the step of phase shifting control of at least one exhaust valve comprises the step of:
 phase shifting control of the at least one exhaust valve such that an opening event of the at least one exhaust valve is obtained in the expansion stroke of the cylinder and such that a closing event of the at least one exhaust valve is obtained in the exhaust stroke of the cylinder.

Thereby, a method is provided capable of significantly increasing the maximum obtainable braking torque of the engine. This is because a closing event of the at least one exhaust valve in the exhaust stroke of the cylinder can ensure that gas is compressed in the cylinder during the exhaust stroke to oppose the movement of the piston.

Optionally, the step of phase shifting control of at least one exhaust valve comprises the step of:
 advancing the control of the at least one exhaust valve a number of crank angle degrees being within the range of 10-110 crank angle degrees or being within the range of 50-95 crank angle degrees.

Thereby, it is ensured that the method can significantly increase the maximum obtainable braking torque of the engine.

Optionally, the step of regulating the amount of air being pumped through the cylinder comprises the steps of:
 reducing the amount of air being pumped through the cylinder by retarding the control of the at least one inlet valve, and
 increasing the amount of air being pumped through the cylinder by advancing the control of the at least one inlet valve.

Thereby, a simple and efficient method is provided for controlling the magnitude of the braking torque in a stepless manner. In addition, the temperature of an exhaust after treatment system can be controlled in a simple and efficient manner during the braking procedure.

Optionally, the step of regulating the amount of air being pumped through the cylinder comprises the step of:
 phase shifting control of the at least one inlet valve within a range being greater than 40 crank angle degrees or within a range being greater than 60 crank angle degrees.

Thereby, a method is provided having conditions for controlling the magnitude of the braking torque in a stepless manner in a wide range. In addition, method is provided having conditions for controlling the temperature of an exhaust after treatment system in a wide range.

Optionally, the method comprises the step of:
 maintaining at least one of a valve lift height and a valve lift profile of the at least one inlet valve as compared to when the cylinder is operating in a power generating mode.

Thereby, the method provides conditions for a simple, reliable, and cost-efficient implementation in an engine of a vehicle. This is because the method provides conditions for using simple and reliable components and systems for controlling the valves of the engine. Moreover, a method is provided having conditions for maintaining a low load on valve control arrangements of valves of the engine and the respective drive train thereof. In addition, a method is provided in which braking can be activated and deactivated in a simple and efficient manner without risking damage or premature wear of valve control arrangements of the engine and the respective drive train thereof.

Optionally, the method comprises the step of:
 maintaining at least one of a valve lift height and a valve lift profile of the at least one exhaust valve as compared to when the cylinder is operating in a power generating mode.

Thereby, the method provides conditions for a simple, reliable, and cost-efficient implementation in an engine of a vehicle. This is because the method provides conditions for using simple and reliable components and systems for controlling the valves of the engine. Moreover, a method is provided having conditions for maintaining a low load on valve control arrangements of valves of the engine and the respective drive train thereof. In addition, a method is provided in which braking can be activated and deactivated in a simple and efficient manner without risking damage or premature wear of valve control arrangements of the engine and the respective drive train thereof.

Optionally, the method comprises the step of:
 controlling the temperature of gas in an exhaust outlet of the cylinder by varying the spacing between opening events of the at least one exhaust valve and opening events of the at least one inlet valve.

Thereby, a method is provided having conditions for a stepless control of the braking torque while being capable of controlling the temperature of an exhaust after treatment system of the engine.

Optionally, the step of controlling the temperature of gas in the exhaust outlet of the cylinder comprises the steps of:
 increasing the temperature of gas in the exhaust outlet by increasing the spacing between opening events of the at least one exhaust valve and opening events of the at least one inlet valve, and
 reducing the temperature of gas in the exhaust outlet by decreasing the spacing between opening events of the at least one exhaust valve and opening events of the at least one inlet valve.

Thereby, a method is provided having conditions for a stepless control of the braking torque while being capable of controlling the temperature of an exhaust after treatment system of the engine in a simple and efficient manner.

Optionally, the step of controlling the temperature of gas in the exhaust outlet of the cylinder comprises the step of:
 varying the spacing between opening events of the at least one exhaust valve and opening events of the at least one inlet valve by simultaneously phase shifting control of the at least one exhaust valve and the at least one inlet valve.

Thereby, a method is provided having conditions for a simultaneous control of the braking torque and of the temperature of an exhaust after treatment system of the engine.

According to a second aspect of the invention, the object is achieved by a computer program comprising instructions which, when the program is executed by a computer, cause the computer to carry out the method according to some embodiments of the present disclosure. Since the computer program comprises instructions which, when the program is executed by a computer, cause the computer to carry out the method according to some embodiments, a computer program is provided which provides conditions for overcoming, or at least alleviating, at least some of the above-mentioned drawbacks. As a result, the above-mentioned object is achieved.

According to a third aspect of the invention, the object is achieved by a computer-readable medium comprising instructions which, when executed by a computer, cause the computer to carry out the method according to some embodiments of the present disclosure. Since the computer-readable medium comprises instructions which, when the program is executed by a computer, cause the computer to carry out the method according to some embodiments, a computer-readable medium is provided which provides conditions for overcoming, or at least alleviating, at least some of the above-mentioned drawbacks. As a result, the above-mentioned object is achieved.

According to a fourth aspect of the invention, the object is achieved by a control arrangement configured to control inlet valves and exhaust valves of a cylinder of an internal combustion engine to obtain an engine braking effect. The control arrangement is configured to:
prevent at least one exhaust valve of the cylinder from closing completely during a plurality of successive intake, compression, expansion, and exhaust strokes of the cylinder,
phase shift control of at least one exhaust valve of the cylinder such that opening and closing events of the at least one exhaust valve are advanced as compared to when the cylinder is operating in a power generating mode, and
regulate the amount of air being pumped through the cylinder by phase shifting control of at least one inlet valve of the cylinder.

Since the control arrangement is configured to prevent the at least one exhaust valve of the cylinder from closing completely, the engine is braked in an efficient manner because when the piston is moving towards the top dead centre in the compression stroke, compressed gas in the cylinder oppose the motion of the piston while some of the gas being compressed can be evacuated through the partially opened exhaust valve. Thus, due to the evacuation of compressed gas through the partially opened exhaust valve, energy which otherwise would be stored in the form of compressed gas in the cylinder is not returned to the crank shaft in the subsequent expansion stroke.

Moreover, since the control arrangement is configured to phase shift control of at least one exhaust valve such that opening and closing events of the at least one exhaust valve are advanced, a control arrangement is provided capable of significantly increasing the maximum obtainable braking torque of the engine. This is because the control of at least one exhaust valve can be phase shifted to positions in which the at least one exhaust valves assume the partially opened position, instead of a fully open position, in the exhaust stroke of the engine. In this manner, compressed gas in the cylinder can oppose the motion of the piston also in the exhaust strokes of the engine to increase the braking torque of the engine.

In addition, since the control arrangement is configured to regulate the amount of air being pumped through the cylinder by phase shifting control of at least one inlet valve of the cylinder, the control arrangement can perform a stepless control of the braking torque obtained. Furthermore, since the control arrangement is configured to regulate the amount of air being pumped through the cylinder, a control arrangement is provided having conditions for regulating the temperature of gas supplied to an exhaust system during the braking procedure so as to control the temperature of an exhaust after treatment system of the engine.

Moreover, since the control arrangement is configured to prevent the at least one exhaust valve of the cylinder from closing completely, the control arrangement allows for a simple, reliable, and cost-efficient implementation in an engine of a vehicle. This is because simple and reliable components and systems can be utilized to prevent at least one exhaust valve of the cylinder from closing completely during a plurality of successive intake, compression, expansion, and exhaust strokes of the cylinder.

Furthermore, since the control arrangement is configured to prevent the at least one exhaust valve of the cylinder from closing completely, the control arrangement provides conditions for obtaining a low load on valve control arrangements of valves of the engine and the respective drive train thereof. In addition, the control arrangement provides conditions for a simple and efficient activation and deactivation of braking without risking damage or premature wear of valve control arrangements of the engine and the respective drive train thereof.

Thus, in summary, a control arrangement is provided having conditions for cost-efficient implementation while having conditions for providing a high maximum obtainable braking power and conditions for a stepless control of the magnitude of the braking power in a manner ensuring a low load on valve control arrangements of valves of the engine and the respective drive train thereof. Moreover, a control arrangement is provided having conditions for controlling the temperature of an exhaust after treatment system in an efficient manner during the braking procedure. In addition, a control arrangement is provided allowing a simple and efficient activation and deactivation of braking without risking damage or premature wear of valve control arrangements of the engine and the respective drive train thereof.

Accordingly, a control arrangement is provided overcoming, or at least alleviating, at least some of the above-mentioned problems and drawbacks. As a result, the above-mentioned object is achieved.

It will be appreciated that the various embodiments described for the method are all combinable with the control arrangement as described herein. That is, the control arrangement according to the fourth aspect of the invention may be configured to perform any one of the method steps of the method according to the first aspect of the invention.

According to a fifth aspect of the invention, the object is achieved by an internal combustion engine comprising a control arrangement according to some embodiments of the present disclosure. Since the internal combustion engine comprises a control arrangement according to some embodiments, an internal combustion engine is provided overcoming, or at least alleviating, at least some of the above-mentioned problems and drawbacks. As a result, the above-mentioned object is achieved.

According to a sixth aspect of the invention, the object is achieved by a vehicle comprising an internal combustion engine according to some embodiments of the present disclosure. Since the vehicle comprises an internal combustion engine according to some embodiments, a vehicle is provided overcoming, or at least alleviating, at least some of the above-mentioned problems and drawbacks. As a result, the above-mentioned object is achieved. Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
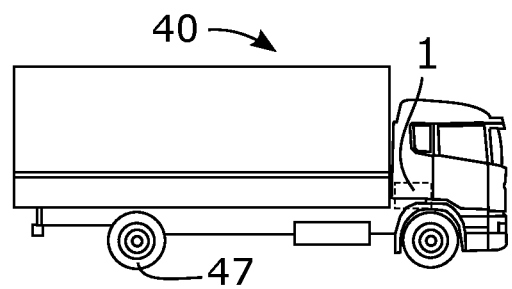
FIG. 1 illustrates a vehicle according to some embodiments of the present disclosure, FIG. 2 schematically illustrates an internal combustion engine of the vehicle illustrated in FIG. 1, FIG. 3 schematically illustrates a cross sectional view of the internal combustion engine illustrated in FIG. 2.

FIG. 1 illustrates a vehicle 40 according to some embodiments of the present disclosure. According to the illustrated embodiments, the vehicle 40 is a truck, i.e. a type of heavy vehicle. According to further embodiments, the vehicle 40, as referred to herein, may be another type of heavy or lighter type of manned or unmanned vehicle for land based propulsion such as a lorry, a bus, a construction vehicle, a tractor, a car, or the like.

The vehicle 40 comprises an internal combustion engine 1. According to the illustrated embodiments, the internal combustion engine 1 is configured to provide motive power to the vehicle 40 via wheels 47 of the vehicle 40. The vehicle 40 may comprise one or more electric propulsion motors in addition to the internal combustion engine 1 for providing motive power to the vehicle 40. Thus, the vehicle 40 may comprise a so called hybrid electric powertrain comprising one or more electric propulsion motors in addition to the internal combustion engine 1 for providing motive power to the vehicle 40.

Figure 2:
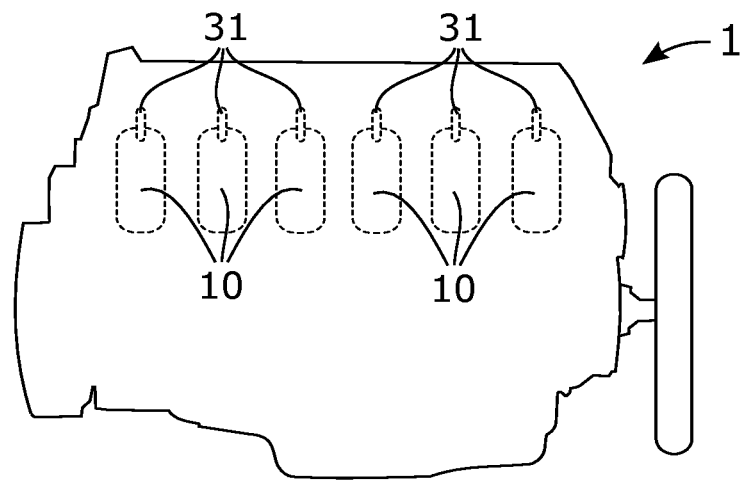

FIG. 2 schematically illustrates the internal combustion engine 1 of the vehicle 40 illustrated in FIG. 1. In FIG. 2, cylinders 10 of the internal combustion engine 1 are schematically indicated. According to the illustrated embodiments, the internal combustion engine 1 comprises six cylinders 10 arranged in one row. The internal combustion engine 1 according to the illustrated embodiments may therefore be referred to an inline-six engine. However, according to further embodiments, the internal combustion engine 1, as referred to herein, may comprise another number of cylinders 10. Moreover, the cylinders 10 of the internal combustion engine 1 may be arranged in another configuration than in one row, such as in two or more rows.

According to the illustrated embodiments, the engine comprises one fuel injector 31 per cylinder 10 wherein each fuel injector 31 is configured to inject fuel directly into a cylinder 10 of the internal combustion engine 1. According to further embodiments, the internal combustion engine 1 may comprise another number of fuel injectors 31 per cylinder 10. Moreover, according to some embodiments, the internal combustion engine 1 may comprise one or more fuel injectors configured to inject fuel into an air inlet of the combustion engine 1 as an alternative to fuel injectors 31 configured to inject fuel into the cylinders 10 or in addition to the fuel injectors 31 configured to inject fuel into the cylinders 10.

According to the illustrated embodiments, the internal combustion engine 1 is a diesel engine, i.e. a type of compression ignition engine. The internal combustion engine 1 may thus be configured to operate on diesel or a diesel-like fuel, such as biodiesel, biomass to liquid (BTL), or gas to liquid (GTL) diesel. Diesel-like fuels, such as biodiesel, can be obtained from renewable sources such as vegetable oil which mainly comprises fatty acid methyl esters (FAME). Diesel-like fuels can be produced from many types of oils, such as rapeseed oil (rapeseed methyl ester, RME) and soybean oil (soy methyl ester, SME).

According to further embodiments, the internal combustion engine 1, as referred to herein, may an Otto engine with a spark-ignition device, wherein the Otto engine may be configured to run on petrol, alcohol, similar volatile fuels, or combinations thereof. Alcohol, such as ethanol, can be derived from renewable biomass. According to embodiments herein, the internal combustion engine 1 is a four-stroke internal combustion engine 1. For reasons of brevity and clarity, the internal combustion engine 1 is in some places herein referred to as the "combustion engine 1" or simply the "engine 1".

Figure 3:
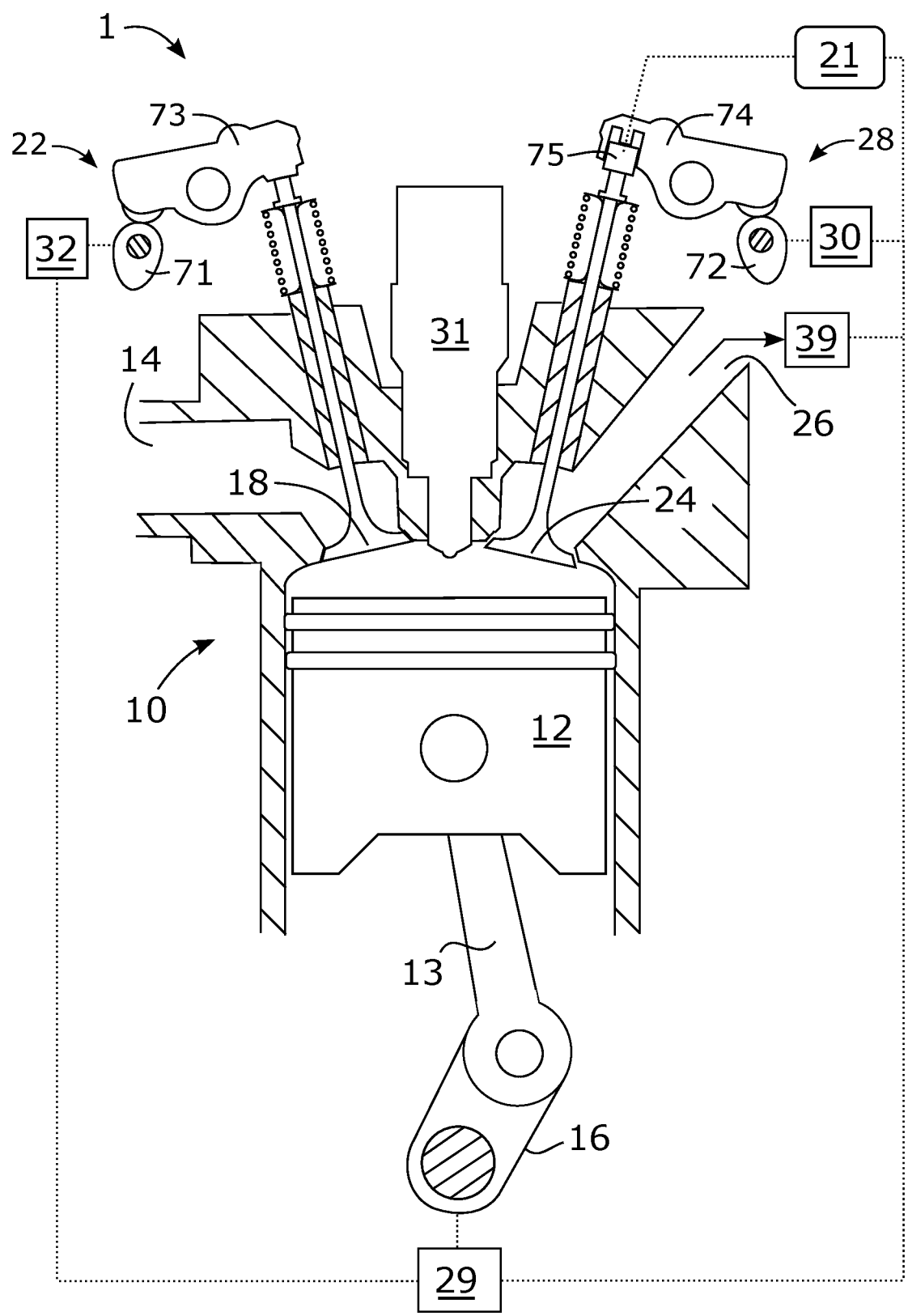

FIG. 3 schematically illustrates a cross sectional view of the internal combustion engine 1 illustrated in FIG. 2. In FIG. 3, the cross section is made in a plane comprising a centre axis of one of the cylinders 10 of the engine 1. The engine 1 comprises at least one cylinder 10 and a piston 12 arranged in each cylinder 10. The piston 12 is connected, via a connecting rod 13 to a crankshaft 16, which at rotation moves the piston 12 forwards and backwards in the cylinder 10, between a top dead centre TDC and a bottom dead centre BDC.

The engine 1 comprises an inlet system 14, which in the illustrated example engine is illustrated as an inlet duct. The inlet system 14 may further comprise an air filter, and according to some embodiments a throttle, a fuel injector, an air flow sensor, and the like. Moreover, the engine 1 may comprise a turbocharger arranged to compress air to the inlet system 14 of the engine 1. Thus, according to such embodiments, the inlet system 14 may be fluidically connected to a compressor of a turbocharger. The compressor may be connected to a shaft which is connected to a turbine of the turbocharger. The turbine may be arranged to be driven by the flow of gases from an exhaust outlet 26 of the engine 1. The engine 1 may comprise more than one turbocharger, wherein the turbochargers may be arranged in parallel or on series.

The engine 1 further comprises at least one inlet valve 18 arranged in each cylinder 10, which at least one inlet valve 18 is connected with the inlet system 14. The engine 1 further comprises an inlet valve control arrangement 22 configured to control each inlet valve 18 on the basis of a rotational position of the crankshaft 16. The engine 1 further comprises at least one exhaust valve 24 arranged in each cylinder 10, which at least one exhaust valve 24 is connected with an exhaust outlet 26 of the engine 1. The engine 1 further comprises an exhaust valve control arrangement 28 configured to control each exhaust valve 24 on the basis of the rotational position of the crankshaft 16. In FIG. 3, the inlet valve 18 is illustrated in a fully closed position and the exhaust valve 24 is illustrated in a partially closed position. In a fully closed position, each valve 18, 24 abuts against a respective valve seat to close fluid connection between the cylinder 10 and the respective inlet system 14 and the exhaust outlet 26.

The inlet valve control arrangement 22 is arranged to control the at least one inlet valve 18 between the fully closed position and an open position by displacing the at least one inlet valve 18 in a direction into the cylinder 10. A fluid connection is thereby opened between the inlet system 14 and the cylinder 10. Likewise, the exhaust valve control arrangement 28 is arranged to control the at least one exhaust valve 24 between the partially closed position or a fully closed position to an open position by displacing the at least one exhaust valve 24 in a direction into the cylinder 10. Thereby, a fluid connection is opened between the cylinder 10 and the exhaust outlet 26. Upon displacement of a valve 18, 24 from the closed position to the open position, the valve 18, 24 is lifted from its valve seat.

The engine 1 further comprises a fuel injector 31 arranged to directly inject fuel into the cylinder 10. As mentioned above, according to the illustrated embodiments, the engine 1 is a diesel engine, i.e. a type of compression ignition engine. According to further embodiments, the engine may be an Otto engine with a spark-ignition device, wherein the Otto engine may be designed to run on gas, petrol, alcohol or similar volatile fuels or combinations thereof. Such fuel may be directly injected into the cylinder 10 using a fuel injector or may be supplied to incoming air prior to entering the cylinder 10, for example by a fuel injector arranged at an inlet duct of the engine. According to the illustrated embodiments, the engine 1 comprises an exhaust after treatment system 39. The exhaust after treatment system 39 may comprise one or more of a catalytic converter, a particulate filter, a Selective catalytic reduction (SCR) arrangement, a Diesel Oxidation Catalyst (DOC), a Lean NOx Trap (LNT) and a Three-Way Catalyst (TWC).

The exhaust valve control arrangement 28 and the inlet valve control arrangement 22 may each comprise one or more camshafts 71, 72 rotatably connected to the crankshaft 16 of the engine 1. Moreover, the exhaust valve control arrangement 28 and the inlet valve control arrangement 22 may each comprise one or more arrangements, such as rocker arms 73, 74, for transferring movement of cam lobes of the camshafts 71, 72 to valve stems of the valves 18, 24 to an open position upon rotation of the respective camshaft 71, 72. According to further embodiments, the cam lobes of the camshafts 71, 72 of the engine 1 may be arranged to displace valves 18, 24 to an open position by pressing onto valve stems of the valves 18, 24 upon rotation of the respective camshaft 71, 72. The exhaust valve control arrangement 28 and/or the inlet valve control arrangement 22 may according to further embodiments comprise electric, pneumatic, or hydraulic actuators arranged to control valves on the basis of the rotational position of the crankshaft 16. The rotational position of the crankshaft 16 may be obtained using a crank angle sensor 29.

The exhaust valve control arrangement 28 comprises an exhaust valve phase-shifting device configured to phase-shift control of the at least one exhaust valve 24 in relation to the crankshaft 16. Moreover, according to the illustrated embodiments, the inlet valve control arrangement 22 comprises an inlet valve phase-shifting device 32 configured to phase-shift control of the at least one inlet valve 18 in relation to the crankshaft 16.

The exhaust valve phase-shifting device 30 and the inlet valve phase-shifting device 32 may each comprise a hydraulic arrangement, for example using engine oil as hydraulic fluid, to phase-shift control of the valves 18, 24 in relation to the crankshaft 16. Such hydraulic arrangement may form part of a belt pulley, gear wheel, sprocket, or the like (not illustrated) arranged to transfer rotation from the crankshaft 16 to a camshaft 71, 72 of the exhaust valve control arrangement 28 and/or the inlet valve control arrangement 22. The hydraulic arrangement may be arranged to regulate an angular relationship between a first portion of the belt pulley, gear wheel, sprocket, or the like, being connected to the crankshaft 16, and a second portion of the belt pulley, gear wheel, sprocket, or the like, being connected to the camshaft 71, 72, in order to phase-shift control of the at least one inlet valve 18 and/or the at least one exhaust valve 24. In embodiments wherein the exhaust valve control arrangement 28 and/or the inlet valve control arrangement 22 comprises electric, pneumatic, or hydraulic actuators, the phase-shift of control of the at least one inlet valve 18 and/or the at least one exhaust valve 24 may be performed in another manner, for example by an electronic phase-shift of control.

The engine 1 further comprises a valve retaining arrangement 75. The valve retaining arrangement 75 is configured to prevent at least one exhaust valve 24 of the cylinder 10 from closing completely when the valve retaining arrangement 75 is transferred to an activated state. That is, the valve retaining arrangement 75 is configured to maintain the at least one exhaust valve 24 in a partially open position when the valve retaining arrangement 75 is in the activated state. As indicated above, in FIG. 3, the exhaust valve 24 is illustrated in such a partially open state. In the partially open state, the valve lift height of the at least one exhaust valve 24 may be a number of millimetres, such as 0.5-4.5 mm, 0.7-3 mm, or 1.5-3 mm. According to some embodiments, the valve lift height of the at least one exhaust valve 24 in the partially open state may be within the range of 3.5-30%, or 5-25%, of a maximum lift height of the at least one exhaust valve 24, i.e. a lift height obtained when the at least one exhaust valve 24 is in the fully open state. According to the illustrated embodiments, the maximum lift height of the at least one exhaust valve 24 is approximately 14 mm. According to further embodiments, the maximum lift height of the at least one exhaust valve 24 may be within the range of 9-16 mm, or may be within the range of 10-15 mm. The partially open state of the at least one exhaust valve 24 may also be referred to as a partially closed state since the at least one exhaust valve 24 is at a position closer to the fully closed state than to a fully open state when in the partially open state.

When the valve retaining arrangement 75 is in a deactivated state, the valve retaining arrangement 75 allows a full closure of the at least one exhaust valve 24. In such a position, the at least one exhaust valve 24 will assume a position corresponding to the position of the inlet valve 18 illustrated in FIG. 3, i.e. a position in which the at least one exhaust valve 24 abuts against a valve seat so as to hinder fluid transport through the at least one exhaust valve 24.

According to the illustrated embodiments, the valve retaining arrangement 75 comprises a hydraulic chamber and a piston, wherein the valve retaining arrangement 75 is activated by applying a hydraulic pressure to the hydraulic chamber and wherein the valve retaining arrangement 75 is deactivated by removing the hydraulic pressure from the hydraulic chamber. Thus, when a hydraulic pressure is applied to the hydraulic chamber, the valve retaining arrangement 75 prevents the at least one exhaust valve 24 from closing completely. As a result, the at least one exhaust valve 24 will assume the partially open state when no opening events is occurring of the at least one exhaust valve 24 as is further explained herein. According to further embodiments, the engine 1 may comprise another type of valve retaining arrangement than a hydraulic valve retaining arrangement 75, such as a mechanical, electrical, electromechanical, or pneumatical valve retaining arrangement.

The engine 1 comprises a control arrangement 21. The control arrangement 21 is operably connected to the valve retaining arrangement 75, the exhaust valve phase-shifting device 30, and the inlet valve phase-shifting device 32 and is configured to control operation thereof. The control arrangement 21 may be operably connected to one or more further components and systems of the engine 1, such as the inlet valve control arrangement 22 and the exhaust valve control arrangement 28 and may be configured to control operation thereof. Furthermore, the control arrangement 21 may be connected to a number of different sensors to obtain signals therefrom. Examples are sensors arranged to sense exhaust pressure, charge air temperature, mass airflow, throttle position, engine speed, engine load, absolute pressure in an inlet manifold, rotational position of the crank shaft 16, etc.

As is further explained herein, the control arrangement 21 is configured to control inlet valves 18 and exhaust valves 24 of the cylinder 10 of the internal combustion engine 1 to obtain an engine braking effect.

Figure 4A:
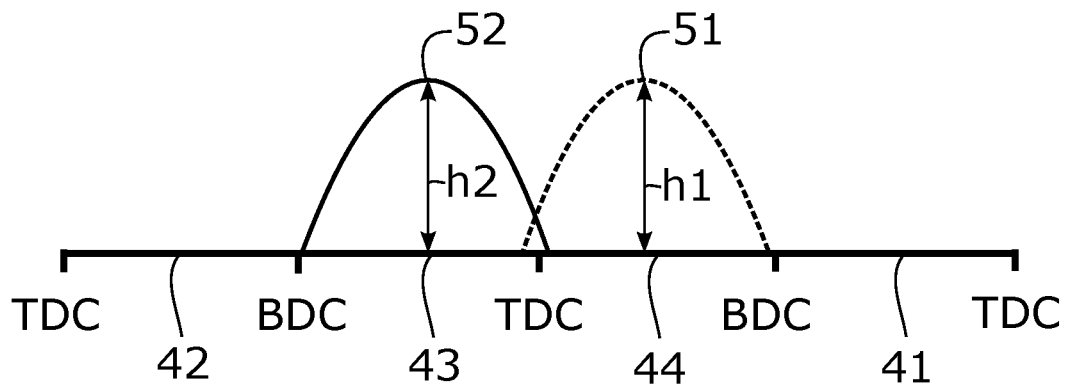
FIG. 4a illustrates valve lift events of at least one inlet valve, and valve lift events of at least one exhaust valve, during a power producing operational mode of the engine illustrated in FIG. 2 and FIG. 3.
Figure 4B:
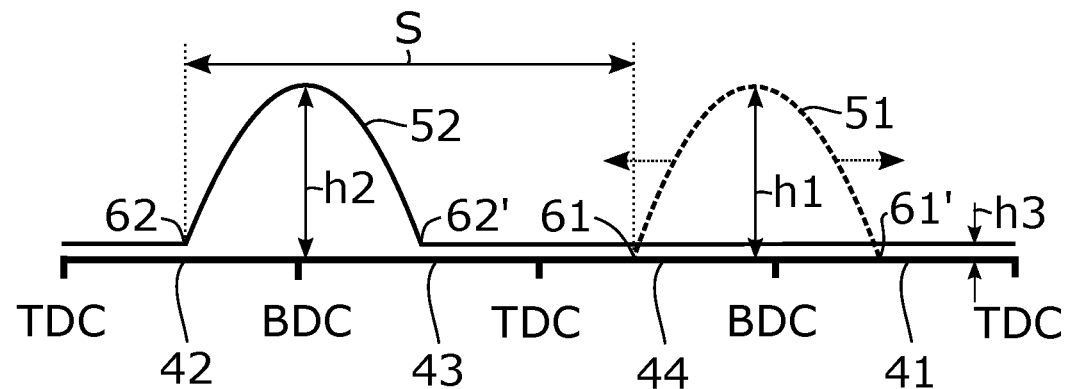
FIG. 4b illustrates valve lift events of the at least one inlet valve, and valve lift events of the at least one exhaust valve, during a first engine braking operational mode of the engine illustrated in FIG. 2 and FIG. 3.
Figure 4C:
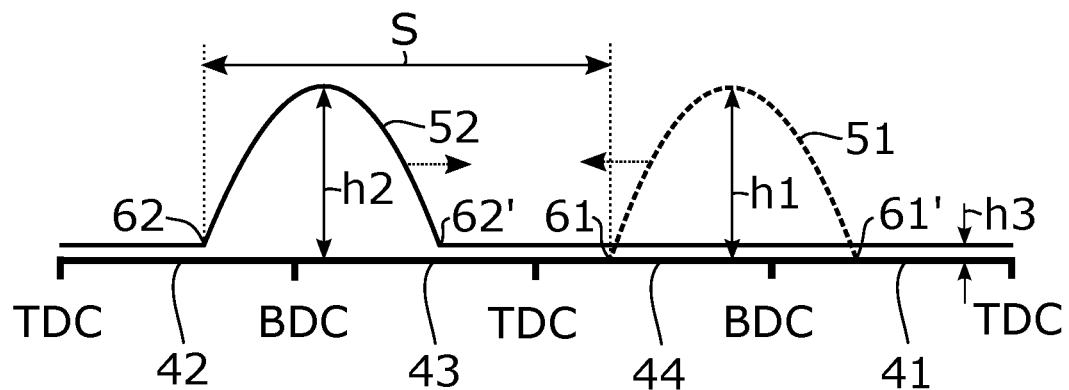
FIG. 4c illustrates valve lift events of the at least one inlet valve and valve lift events of the at least one exhaust valve, during a second engine braking operational mode of the engine illustrated in FIG. 2 and FIG. 3.

FIG. 4a-FIG. 4c illustrate valve lift events 51, 52 in different operational modes of the exhaust valve control arrangement 28, the inlet valve control arrangement 22 and the valve retaining arrangement 75 of the engine 1 illustrated in FIG. 3. Therefore, below, reference is made to the FIG. 4a-FIG. 4c, as well as to FIG. 3, if not indicated otherwise. The curves illustrated in FIG. 4a-FIG. 4c illustrate valve lift events performed during two revolutions of the crank shaft 16, i.e. during all four strokes of the four-stroke internal combustion engine 1. In these figures, the strokes are illustrated in the following order: compression stroke 41, expansion stroke 42, exhaust stroke 43 and inlet stroke 44.

FIG. 4a illustrates valve lift events 51 of the at least one inlet valve 18, and valve lift events 52 of the at least one exhaust valve 24, during a power producing operational mode of the engine 1. As indicated, during the compression stroke 41 and the expansion stroke 42, the at least one inlet valve 18 and the at least one exhaust valve 24 are closed. When the piston reaches the bottom dead centre BDC at the end of the expansion stroke 42, the exhaust valve control arrangement 28 controls the at least one exhaust valve 24 to an open position to allow exhaust gases to be expelled from the cylinder 10 to the exhaust outlet 26 during the exhaust stroke 43. In the transition area between the exhaust stroke 43 and the inlet stroke 44, the exhaust valve control arrangement 28 controls the at least one exhaust valve 24 to a closed position.

Moreover, in the transition area between the exhaust stroke 43 and the inlet stroke 44, the inlet valve control arrangement 22 controls the at least one inlet valve 18 to an open position to allow air, or an air/fuel mixture, to enter the cylinder 10 during the inlet stroke 44. Towards the end of the inlet stroke 44, the inlet valve control arrangement 22 controls the at least one inlet valve 18 to a closed position to allow compression of the air, or the air/fuel mixture, in the subsequent compression stroke 41. The valve lift events 51 of the at least one inlet valve 18 and the valve lift events 52 of the at least one exhaust valve 24 illustrated in FIG. 4a may be the same during normal engine braking of the engine 1, occurring for example when a driver of a vehicle releases an accelerator pedal and no additional braking torque is requested.

FIG. 4b illustrates valve lift events 51 of the at least one inlet valve 18 and valve lift events 52 of the at least one exhaust valve 24, during a first engine braking operational mode of the engine 1. In this mode, the control arrangement 21 is configured to prevent at least one exhaust valve 24 of the cylinder 10 from closing completely during a plurality of successive intake, compression, expansion, and exhaust strokes 41-44 of the cylinder 10. According to the illustrated embodiments, the control arrangement 21 is configured to prevent at least one exhaust valve 24 of the cylinder 10 from closing completely by activating the valve retaining arrangement 75. As a result, the at least one exhaust valve will assume the partially open position, as illustrated in FIG. 3, and will obtain a small lift height h3, as indicated in FIG. 4b, during a series of successive intake, compression, expansion, and exhaust strokes 41-44 of the cylinder 10. The partially open position of the at least one exhaust valve 24 ensures that gas is compressed in the cylinder 10 while simultaneously evacuating some of the compressed air through the at least one exhaust valve 24. In this manner, energy which otherwise would be stored in the form of compressed gas in the cylinder 10 is not returned to the crank shaft 16 when the piston 12 is moved towards the bottom dead centre in the expansion stroke 42 of the engine 1.

Moreover, the control arrangement 21 is configured to phase shift control of at least one exhaust valve 24 of the cylinder 10 such that opening and closing events 62, 62' of the at least one exhaust valve 24 are advanced as compared to when the cylinder 10 is operating in a power generating mode. That is, as can be seen when comparing FIG. 4a and FIG. 4b, the control of the at least one exhaust valve 24 has been phase shifted such that an opening event 62 of the at least one exhaust valve 24 from the partially open position is obtained in the expansion stroke 42 of the cylinder 10 and such that a closing event 62' of the at least one exhaust valve 24 to the partially open position is obtained in the exhaust stroke 43 of the cylinder 10. In FIG. 4b, the control of the at least one exhaust valve 24 has been advanced approximately 83 crank angle degrees as compared to when the engine 1 is operating in the power producing mode, i.e. as in the mode illustrated in FIG. 4a. According to some embodiments, the control arrangement 21 may be configured to advance control of the at least one exhaust valve 24 a number of crank angle degrees being within the range of 10-110 crank angle degrees or being within the range of 50-95 crank angle degrees.

Thereby, a higher braking torque of the engine 1 can be obtained because gas can be compressed and be partially evacuated from the cylinder 10 also in the exhaust stroke 43 of the cylinder 10. As understood from the above, in this mode, an opening event 62 of the at least one exhaust valve 24 is an event in which the at least one exhaust valve 24 is lifted from the partially open position towards a fully open position. Likewise, in this mode, a closing event 62' of the at least one exhaust valve 24 is an event in which the at least one exhaust valve 24 is moved from an open position to the partially open position. Moreover, as understood from the above, apart from the phase shifting of the control of the at least one exhaust valve 24, the exhaust valve control arrangement 28 may continue to operate with opening and closing events 62, 62' of the at least one exhaust valve during the braking mode with the difference that the at least one exhaust valve 24 is prevented from closing completely.

As can be seen when comparing FIG. 4a and FIG. 4b, according to the illustrated embodiments, the engine 1 is arranged such that a valve lift height h2 and a valve lift profile of the at least one exhaust valve 24 is maintained in the braking mode as compared to when the cylinder 10 is operating in a power generating mode. That is, as can be seen when comparing FIG. 4a and FIG. 4b, the valve lift height h2 and a valve lift profile of the at least one exhaust valve 24 is the same when performing engine braking, i.e. in FIG. 4b, as when the engine 1 is operating in the power generating mode as illustrated in FIG. 4a. This is an effect of the feature that the valve retaining arrangement 75 is only configured to prevent the at least one exhaust valve 24 from closing completely when activated without further affecting the lift height or valve lift profile of the at least one exhaust valve 24 during valve lift events 52 thereof.

Similarly, as can be seen when comparing FIG. 4a and FIG. 4b, according to the illustrated embodiments, the engine 1 is arranged such that a valve lift height h1 and a valve lift profile of the at least one inlet valve 18 is maintained in the braking mode as compared to when the cylinder 10 is operating in a power generating mode. That is, as can be seen when comparing FIG. 4a and FIG. 4b, the valve lift height h1 and a valve lift profile of the at least one inlet valve 18 is the same when performing engine braking, i.e. in FIG. 4b, as when the engine 1 is operating in the power generating mode in as illustrated in FIG. 4a.

The valve lift profile, as referred to herein, is the profile of the valve lift of the respective at least one inlet valve 18 and the at least one exhaust valve 24 within the meaning of how the valve 18, 24 is moved towards more open and more closed states, regarding movement of the valve 18, 24 and rate of change of the movement of the valve 18, 24. The valve lift profile can be obtained by plotting the position of the valve 18, 24 in a two dimensional graph, wherein one axis denotes the position of the valve 18, 24 and the other axis denotes a current crank angle. The valve lift profile, as referred to herein, is the form/shape of such a curve and not the position of the curve relative to the axis denoting crank angle degrees.

According to embodiments herein, the control arrangement 21 is configured to regulate the amount of air being pumped through the cylinder 10 by phase shifting control of at least one inlet valve 18 of the cylinder 10. In FIG. 4b, the control of the at least one exhaust valve 24 has been retarded approximately 88.5 crank angle degrees as compared to when the engine 1 is operating in the power producing mode, i.e. in the mode illustrated in FIG. 4a. According to some embodiments of the herein described, the control arrangement 21 may be configured to phase shift control of the at least one inlet valve 18 within a range being greater than 40 crank angle degrees or within a range being greater than 60 crank angle degrees. In this manner, a stepless control of the braking torque of the engine 1 can be performed within a wide operational range. Moreover, the temperature of gas leaving the engine through the exhaust outlet 26, and thereby also of the exhaust after treatment system 39, can be controlled in an efficient manner, as is further explained herein.

In more detail, as can be seen in FIG. 4b, according to the illustrated embodiments, the control of at least one inlet valve 18 of the cylinder 10 is phase shifted to a position in which an opening event 61 of the at least one inlet valve 18 is obtained in the intake stroke 44 and a closing event 61' of the at least one inlet valve 18 is obtained in the compression stroke 41 of the engine 1. From this position, the amount of air being pumped through the cylinder 10 can be decreased by retarding the control of the at least one inlet valve 18 a number of crank angle degrees. Likewise, from this position, the amount of air being pumped through the cylinder 10 can be increased by advancing the control of the at least one inlet valve 18 a number of crank angle degrees. The control arrangement 21 may thus phase shift control of the at least one inlet valve 18 back and forth to obtain a certain braking torque of the engine 1 for example based on a wanted braking torque of the engine 1, a rotational speed of the engine 1, and/or a wanted temperature level of gases leaving the engine 1 via the exhaust outlet 26, and the like.

According to some embodiments, the control arrangement 21 is configured to control the temperature of gas in an exhaust outlet 26 of the cylinder 10 by varying the spacing S between opening events 62 of the at least one exhaust valve 24 and opening events 61 of the at least one inlet valve 18. As indicated in FIG. 4b, the spacing S, as referred to herein, can be defined as the distance between an opening event 62 of the at least one exhaust valve 24 and an opening event 61 of the at least one inlet valve 18 measured in a number of crank angle degrees.

FIG. 4c illustrates valve lift events 51 of the at least one inlet valve 18 and valve lift events 52 of the at least one exhaust valve 24, during a second engine braking operational mode of the engine 1. As can be seen when comparing FIG. 4b and FIG. 4c, the spacing S between opening events 62 of the at least one exhaust valve 24 and opening events 61 of the at least one inlet valve 18 has been reduced in FIG. 4c as compared to in FIG. 4b. The control arrangement 21 may vary the spacing S between opening events 62 of the at least one exhaust valve 24 and opening events 61 of the at least one inlet valve 18 by simultaneously phase shifting control of the at least one exhaust valve 24 and the at least one inlet valve 18.

From the position illustrated in FIG. 4c, the temperature of gas in the exhaust outlet 26 can be increased by increasing the spacing S between opening events 62 of the at least one exhaust valve 24 and opening events 61 of the at least one inlet valve 18. Likewise, from position illustrated in FIG. 4c, the temperature of gas in the exhaust outlet 26 can be reduced by decreasing the spacing S between opening events 62 of the at least one exhaust valve 24 and opening events 61 of the at least one inlet valve 18. In this manner, the control arrangement 21 can control the temperature of the exhaust after treatment system 39 in an efficient manner while being capable of controlling the magnitude of the obtained braking torque of the engine 1 by controlling the position of the opening events 61 and closing events 61' of the at least one inlet valve 18, i.e. by controlling the phase shift of the at least one inlet valve 18.

Figure 5:
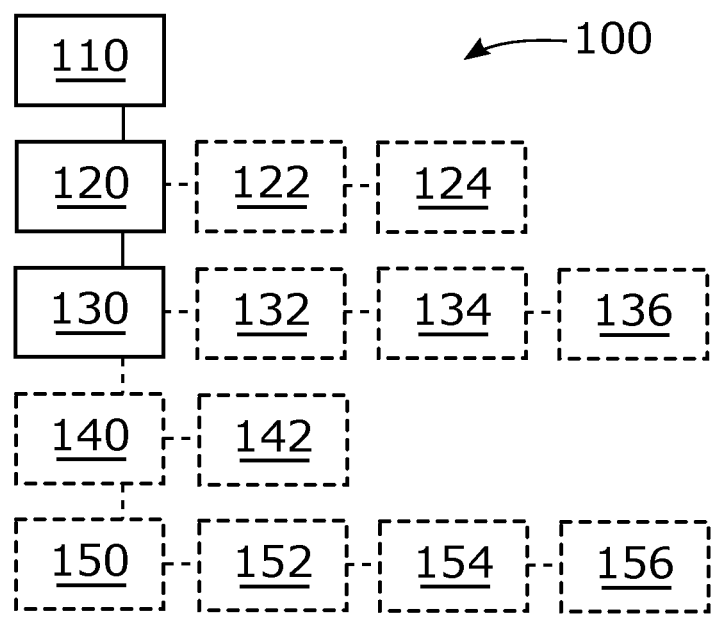
FIG. 5 illustrates a method of controlling inlet valves and exhaust valves of a cylinder of an internal combustion engine to obtain an engine braking effect.

FIG. 5 illustrates a method 100 of controlling inlet valves and exhaust valves of a cylinder of an internal combustion engine to obtain an engine braking effect. The internal combustion engine may be an engine 1 according to the embodiments explained with reference to FIG. 2-FIG. 4c. Therefore, in the following, simultaneous reference is made to FIG. 2-FIG. 4c, if not indicated otherwise.

The method 100 is a method of controlling inlet valves 18 and exhaust valves 24 of a cylinder of an internal combustion engine 1 to obtain an engine braking effect. The method 100 comprises the steps of:

preventing 110 at least one exhaust valve 24 of the cylinder 10 from closing completely during a plurality of successive intake, compression, expansion, and exhaust strokes 41-44 of the cylinder 10, phase shifting 120 control of at least one exhaust valve 24 of the cylinder 10 such that opening and closing events 62, 62' of the at least one exhaust valve 24 are advanced as compared to when the cylinder 10 is operating in a power generating mode, and regulating 130 the amount of air being pumped through the cylinder 10 by phase shifting control of at least one inlet valve 18 of the cylinder 10.

As indicated in FIG. 5, the step of phase shifting 120 control of at least one exhaust valve 24 may comprise the step of:

phase shifting 122 control of the at least one exhaust valve 24 such that an opening event 62 of the at least one exhaust valve 24 is obtained in the expansion stroke 42 of the cylinder 10 and such that a closing event 62' of the at least one exhaust valve 24 is obtained in the exhaust stroke 43 of the cylinder 10.

Moreover, as indicated in FIG. 5, the step of phase shifting 120 control of at least one exhaust valve 24 may comprise the step of:

advancing 124 the control of the at least one exhaust valve 24 a number of crank angle degrees being within the range of 10-110 crank angle degrees or being within the range of 50-95 crank angle degrees.

Furthermore, as indicated in FIG. 5, the step of regulating 130 the amount of air being pumped through the cylinder 10 may comprise the steps of:

reducing 132 the amount of air being pumped through the cylinder 10 by retarding the control of the at least one inlet valve 18, and increasing 134 the amount of air being pumped through the cylinder 10 by advancing the control of the at least one inlet valve 18.

As indicated in FIG. 5, the step of regulating 130 the amount of air being pumped through the cylinder 10 may comprise the step of:

phase shifting 136 control of the at least one inlet valve 18 within a range being greater than 40 crank angle degrees or within a range being greater than 60 crank angle degrees.

Moreover, as indicated in FIG. 5, the method 100 may comprise the step of:

maintaining 140 at least one of a valve lift height h1 and a valve lift profile of the at least one inlet valve 18 as compared to when the cylinder 10 is operating in a power generating mode.

Furthermore, as indicated in FIG. 5, the method 100 may comprise the step of:

maintaining 142 at least one of a valve lift height h2 and a valve lift profile of the at least one exhaust valve 24 as compared to when the cylinder 10 is operating in a power generating mode.

As indicated in FIG. 5, the method 100 may comprise the step of:

controlling 150 the temperature of gas in an exhaust outlet 26 of the cylinder 10 by varying the spacing S between opening events 62 of the at least one exhaust valve 24 and opening events 61 of the at least one inlet valve 18.

Furthermore, as indicated in FIG. 5, the step of controlling the temperature of gas in the exhaust outlet 26 of the cylinder 10 may comprise the steps of:

increasing 152 the temperature of gas in the exhaust outlet 26 by increasing the spacing S between opening events 62 of the at least one exhaust valve 24 and opening events 61 of the at least one inlet valve 18, and reducing 154 the temperature of gas in the exhaust outlet 26 by decreasing the spacing S between opening events 62 of the at least one exhaust valve 24 and opening events 61 of the at least one inlet valve 18.

Moreover, as indicated in FIG. 5, the step of controlling the temperature of gas in the exhaust outlet 26 of the cylinder 10 may comprise the step of:

varying 156 the spacing S between opening events 62 of the at least one exhaust valve 24 and opening events 61 of the at least one inlet valve 18 by simultaneously phase shifting control of the at least one exhaust valve 24 and the at least one inlet valve 18.

It will be appreciated that the various embodiments described for the method 100 are all combinable with the control arrangement 21 as described herein. That is, the control arrangement 21 may be configured to perform any one of the method steps 110, 120, 122, 124, 130, 132, 134, 136, 140, 142, 150, 152, 154, and 156 of the method 100.

Figure 6:
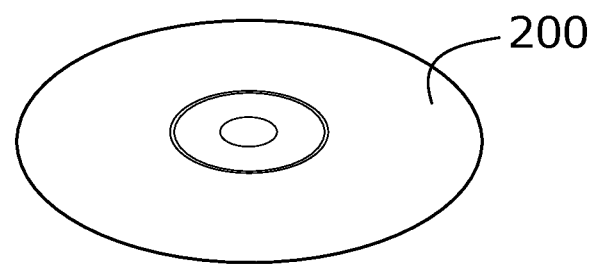
FIG. 6 illustrates a computer-readable medium according to some embodiments.

FIG. 6 illustrates a computer-readable medium 200 comprising instructions which, when executed by a computer, cause the computer to carry out the method 100 according to some embodiments of the present disclosure. According to some embodiments, the computer-readable medium 200 comprises a computer program comprising instructions which, when the program is executed by a computer, cause the computer to carry out the method 100 according to some embodiments.

One skilled in the art will appreciate that the method 100 of controlling inlet valves 18 and exhaust valves 24 of a cylinder 10 of an internal combustion engine 1 to obtain an engine braking effect may be implemented by programmed instructions. These programmed instructions are typically constituted by a computer program, which, when it is executed in the control arrangement 21, ensures that the control arrangement 21 carries out the desired control, such as the method steps 110, 120, 122, 124, 130, 132, 134, 136, 140, 142, 150, 152, 154, and 156 described herein. The computer program is usually part of a computer program product 200 which comprises a suitable digital storage medium on which the computer program is stored.

The control arrangement 21 may comprise a calculation unit which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

The control arrangement 21 may further comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control arrangement 21 is connected to components of the combustion engine 1 for receiving and/or sending input and output signals. These input and output signals may comprise waveforms, pulses, or other attributes which the input signal receiving devices can detect as information and which can be converted to signals processable by the control arrangement 21. These signals may then be supplied to the calculation unit. One or more output signal sending devices may be arranged to convert calculation results from the calculation unit to output signals for conveying to other parts of the vehicle's control system and/or the component or components for which the signals are intended. Each of the connections to the respective components of the combustion engine 1 for receiving and sending input and output signals may take the form of one or more from among a cable, a data bus, e.g. a CAN (controller area network) bus, a MOST (media orientated systems transport) bus or some other bus configuration, or a wireless connection.

In the embodiments illustrated, the combustion engine 1 comprises a control arrangement 21 but might alternatively be implemented wholly or partly in two or more control arrangements or two or more control units.

Control systems in modern vehicles generally comprise a communication bus system consisting of one or more communication buses for connecting a number of electronic control units (ECUs), or controllers, to various components on board the vehicle. Such a control system may comprise a large number of control units and taking care of a specific function may be shared between two or more of them. Vehicles and engines of the type here concerned are therefore often provided with significantly more control arrangements than depicted in FIG. 3, as one skilled in the art will surely appreciate.

The computer program product 200 may be provided for instance in the form of a data carrier carrying computer program code for performing at least some of the method steps 110, 120, 122, 124, 130, 132, 134, 136, 140, 142, 150, 152, 154, and 156 according to some embodiments when being loaded into one or more calculation units of the control arrangement 21. The data carrier may be, e.g. a CD ROM disc, as is illustrated in FIG. 6, or a ROM (read-only memory), a PROM (programable read-only memory), an EPROM (erasable PROM), a flash memory, an EEPROM (electrically erasable PROM), a hard disc, a memory stick, an optical storage device, a magnetic storage device or any other appropriate medium such as a disk or tape that may hold machine readable data in a non-transitory manner. The computer program product may furthermore be provided as computer program code on a server and may be downloaded to the control arrangement 21 remotely, e.g., over an Internet or an intranet connection, or via other wired or wireless communication systems.

The features "advanced" and "advancing", as used herein means that a control or event referred to is performed earlier regarding crank angle degrees or time, as compared to if the control or event would not be advanced. The features "retarded" and "retarding", as used herein means that a control or event referred to is performed later regarding crank angle degrees or time, as compared to if the control or event would not be retarded.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A method of controlling inlet valves and exhaust valves of a cylinder of an internal combustion engine to obtain an engine braking effect,
wherein the method comprises the steps of:
preventing at least one exhaust valve of the cylinder from closing completely during a plurality of successive intake, compression, expansion, and exhaust strokes of the cylinder,
phase shifting control of the at least one exhaust valve of the cylinder such that opening and closing events of the at least one exhaust valve are advanced as compared to when the cylinder is operating in a power generating mode, and
regulating an amount of air being pumped through the cylinder by phase shifting control of at least one inlet valve of the cylinder.

2. The method according to claim 1, wherein the step of phase shifting control of at least one exhaust valve comprises the step of:
phase shifting control of the at least one exhaust valve such that an opening event of the at least one exhaust valve is obtained in the expansion stroke of the cylinder and such that a closing event of the at least one exhaust valve is obtained in the exhaust stroke of the cylinder.

3. The method according to claim 1, wherein the step of phase shifting control of at least one exhaust valve comprises the step of:
advancing the control of the at least one exhaust valve a number of crank angle degrees being within the range of 10-110 crank angle degrees or being within the range of 50-95 crank angle degrees.

4. The method according to claim 1, wherein the step of regulating the amount of air being pumped through the cylinder comprises the steps of:
reducing the amount of air being pumped through the cylinder by retarding the control of the at least one inlet valve, and
increasing the amount of air being pumped through the cylinder by advancing the control of the at least one inlet valve.

5. The method according to claim 1, wherein the step of regulating the amount of air being pumped through the cylinder comprises the step of:
phase shifting control of the at least one inlet valve within a range being greater than 40 crank angle degrees or within a range being greater than 60 crank angle degrees.

6. The method according to claim 1, wherein the method comprises the step of:

maintaining at least one of a valve lift height (h1) and a valve lift profile of the at least one inlet valve as compared to when the cylinder is operating in the power generating mode.

7. The method according to claim 1, wherein the method comprises the step of:
maintaining at least one of a valve lift height (h2) and a valve lift profile of the at least one exhaust valve as compared to when the cylinder is operating in the power generating mode.

8. The method according to claim 1, wherein the method comprises the step of:
controlling a temperature of gas in an exhaust outlet of the cylinder by varying a spacing(S) between opening events of the at least one exhaust valve and opening events of the at least one inlet valve.

9. The method according to claim 8, wherein the step of controlling the temperature of gas in the exhaust outlet of the cylinder comprises the step of:
varying the spacing(S) between opening events of the at least one exhaust valve and opening events of the at least one inlet valve by simultaneously phase shifting control of the at least one exhaust valve and the at least one inlet valve.

10. A computer program comprising instructions which, when the program is executed by a computer, cause the computer to carry out the method according to claim 1.

11. A non-transitory computer-readable medium comprising instructions which, when executed by a computer, cause the computer to carry out the method according to claim 1.

12. A control arrangement configured to control inlet valves and exhaust valves of a cylinder of an internal combustion engine to obtain an engine braking effect, wherein the control arrangement is configured to:
prevent at least one exhaust valve of the cylinder from closing completely during a plurality of successive intake, compression, expansion, and exhaust strokes of the cylinder,
phase shift control of the at least one exhaust valve of the cylinder such that opening and closing events of the at least one exhaust valve are advanced as compared to when the cylinder is operating in a power generating mode, and
regulate an amount of air being pumped through the cylinder by phase shifting control of at least one inlet valve of the cylinder.

13. An internal combustion engine comprising a control arrangement according to claim 12.

14. A vehicle comprising an internal combustion engine according to claim 13.

* * * * *